(12) United States Patent
Matsumoto et al.

(10) Patent No.: US 10,804,508 B2
(45) Date of Patent: Oct. 13, 2020

(54) SEALED CELL AND CELL PACK

(71) Applicant: TOYOTA JIDOSHA KABUSHIKI KAISHA, Toyota-shi, Aichi (JP)

(72) Inventors: Mizuho Matsumoto, Toyota (JP); Tomohiro Matsuura, Toyota (JP); Satomi Yamamoto, Miyoshi (JP); Yuki Yamasaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 188 days.

(21) Appl. No.: 15/869,370

(22) Filed: Jan. 12, 2018

(65) Prior Publication Data
US 2018/0226620 A1 Aug. 9, 2018

(30) Foreign Application Priority Data

Feb. 6, 2017 (JP) .................................. 2017-019936

(51) Int. Cl.
| | |
|---|---|
| *H01M 2/08* | (2006.01) |
| *H01G 11/80* | (2013.01) |
| *H01M 2/36* | (2006.01) |
| *H01M 2/10* | (2006.01) |
| *H01M 2/12* | (2006.01) |
| *H01G 11/22* | (2013.01) |

(Continued)

(52) U.S. Cl.
CPC .............. *H01M 2/08* (2013.01); *H01G 11/12* (2013.01); *H01G 11/18* (2013.01); *H01G 11/22* (2013.01); *H01G 11/76* (2013.01); *H01G 11/80* (2013.01); *H01M 2/1077* (2013.01); *H01M 2/1241* (2013.01); *H01M 2/365* (2013.01); *H01G 11/74* (2013.01); *H01M 10/0525* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | |
|---|---|---|
| 2011/0117425 A1 | 5/2011 | Kwak et al. |
| 2015/0111094 A1 | 4/2015 | Katayama et al. |

(Continued)

FOREIGN PATENT DOCUMENTS

| | | |
|---|---|---|
| CN | 104576978 A | 4/2015 |
| JP | 10-233202 A | 9/1998 |

(Continued)

*Primary Examiner* — Tracy M Dove
(74) *Attorney, Agent, or Firm* — Sughrue Mion, PLLC

(57) ABSTRACT

A sealed cell according to the present invention includes an angular case 50 that accommodates an electrode body. The angular case 50 includes a concave case main body 52, having an opening, and a sealing member 54. The case main body 52 has a flat surface 52a opposed to the sealing member 54, with the electrode body interposed therebetween, and a side wall 52b rising from the flat surface 52a. The peripheral edge portion of the opening provided in the case main body 52 and the sealing member 54 are joined to each other by seal welding. Concave and convex portions including concave portions 56a, 156a recessed toward the inside of the case and convex portions 56b flush with the flat surface 52a are formed on at least one side 58a portion of end sides of the flat surface 52a. Electrode terminals 80, 82 are disposed on bottom surfaces of the concave portions 56a, 156a.

6 Claims, 14 Drawing Sheets

(51) Int. Cl.
*H01G 11/12* (2013.01)
*H01G 11/18* (2013.01)
*H01G 11/76* (2013.01)
H01G 11/74 (2013.01)
H01M 10/0525 (2010.01)

(56) References Cited

U.S. PATENT DOCUMENTS

2016/0351345 A1 12/2016 Majima et al.
2018/0108949 A1 4/2018 Negishi et al.

FOREIGN PATENT DOCUMENTS

| | | |
|---|---|---|
| JP | 2004-103369 A | 4/2004 |
| JP | 5194059 B2 | 5/2013 |
| JP | 2013-178894 A | 9/2013 |
| JP | 2015-60690 A | 3/2015 |
| JP | 2015-82386 A | 4/2015 |
| JP | 2015-149362 A | 8/2015 |
| JP | 2015-176782 A | 10/2015 |
| JP | 2015-185242 A | 10/2015 |
| JP | 5966457 B2 | 8/2016 |
| WO | 2016/204147 A1 | 12/2016 | ns
SEALED CELL AND CELL PACK

CROSS-REFERENCE

This application claims priority based on Japanese Patent Application No. 2017-019936 filed on Feb. 6, 2017, the entire contents of which are incorporated herein by reference.

BACKGROUND OF THE INVENTION

1. Field of the Invention

The present invention relates to a sealed cell and a cell pack.

2. Description of the Related Art

A cell pack in which a power storage element such as a lithium ion secondary cell, a nickel hydride cell or other secondary cell or a capacitor that is lightweight and capable of obtaining a high energy density is taken as a unit cell and a plurality of such unit cells are connected in series is a power source making it possible to obtain a high output, and such a cell pack has been advantageously used as a power source to be installed on a vehicle or as a power source for personal computers and mobile terminals. For example, Japanese Patent No. 5966457 discloses an example of a cell pack which is configured by arranging a plurality of angular unit cells and connecting in series positive electrode terminals and negative electrode terminals provided for each unit cell. In such a cell pack, a plurality of unit cells are disposed by alternately, one by one, reversing the unit cells so that the respective positive electrode terminals and negative electrode terminals are disposed alternately. Japanese Patent Application Publication No. 2015-176782 is a technical document relating to a thin cell.

SUMMARY OF THE INVENTION

Meanwhile, in order to improve the energy density of each unit cell, the inventors of the present invention considered increasing the size of a restraint surface 2 (lateral direction X and longitudinal direction Y) of each unit cell 1 and reducing the size in the thickness direction (arrangement direction of unit cells assembled into a cell pack) Z with respect to the size in the lateral direction X and the size in the longitudinal direction Y, as shown in FIG. 14. Regarding this point, Japanese Patent Application Publication No. 2015-176782 discloses a thin cell which has an outer housing including a concave metallic case main body (first member) and a metallic sealing plate (second member) that seals the opening of the case main body, and in which one surface in the thickness direction of the electrode body, which is on the side opposite to the first side wall portion of the case main body, is open. In such a thin cell, the peripheral edge portion of the sealing plate is joined to the peripheral edge portion of the opening of the case main body, whereby a sealed space is formed in the outer housing. However, a problem is that when a sealed structure is obtained by overlapping the two metallic cases (the first member and the second member) and sealing the peripheral edge portion by welding or the like, it is difficult to ensure the sealing property of one side portion of the portion of the electrode terminal which is taken from the inside of the case to the outside of the case.

The present invention has been made in view of the above problem, and it is a main object of the present invention to provide a sealed cell capable of sufficiently ensuring the sealing property, and also a cell pack constructed using such cells.

A sealed cell provided by the present invention includes: an electrode body that includes a positive electrode and a negative electrode; an angular case that accommodates the electrode body and an electrolytic solution; and electrode terminals that are electrically connected to the electrode body and drawn to the outside of the case. The angular case includes a concave case main body having an opening and a sealing member attached so as to cover the opening of the case main body. The case main body has a flat surface opposed to the sealing member, with the electrode body interposed therebetween, and a side wall rising from the flat surface so as to surround the electrode body. A peripheral edge portion of the opening provided in the case main body and the sealing member are joined to each other by seal welding. Concave and convex portions including concave portions, which are recessed toward the inside of the case, and convex portions, which are flush with the flat surface, are formed on at least one side portion of sides of the flat surface. The electrode terminals are disposed on bottom surfaces of the concave portions.

With such a configuration, when a load (for example, a restraining load at the time of forming a cell pack) is applied to the flat surface of the case main body, a convex portion that is flush with the flat surface is pressed, so that the load can be adequately transmitted to the joint portion of the peripheral edge portion of the opening of the case main body and the sealing plate through the side wall. Therefore, the sealing property in the joint portion of the peripheral edge portion of the opening of the case main body and the sealing plate is effectively enhanced in the one side portion of the electrode terminal that is taken from the inside of the case to the outside of the case. As a result, it is possible to provide a sealed cell in which the sealing property is sufficiently ensured.

In a preferred embodiment of the sealed cell disclosed herein, a gas discharge valve for discharging gas generated in the case is disposed on a bottom surface of the concave portion. In this way, it is possible to realize a sealed cell in which the sealing property is sufficiently ensured on one side of the flat surface on which the gas discharge valve is disposed.

In a preferred embodiment of the sealed cell disclosed herein, a liquid injection plug for closing a liquid injection hole for the electrolytic solution is disposed in the bottom surface of the concave portion. In this way, it is possible to realize a sealed cell in which the sealing property is sufficiently ensured on one side of the flat surface in which the liquid injection plug is disposed.

According to the present invention, there is also provided a cell pack in which a plurality of chargeable/dischargeable cells are connected in series. The cell pack includes a plurality of sealed unit cells each including: an electrode body that includes a positive electrode and a negative electrode; an angular case that accommodates the electrode body and an electrolytic solution; and electrode terminals that are electrically connected to the electrode body and drawn to the outside of the case. The angular case includes a concave case main body having an opening and a sealing member attached so as to cover the opening of the case main body. The plurality of unit cells are arranged in a direction in which the case main body and the sealing member are overlapped in the case provided in each of the unit cells, and are restrained in a state in which a load is applied in the arrangement direction. The case main bodies have flat surfaces, which are mutually opposing surfaces of the adjacent unit cell cases and which receive a load applied at the time of restraint, and side walls rising from the flat surfaces so as to surround the electrode body. A peripheral edge portion of the opening provided in the case main body and the sealing member are joined to each other by seal welding. Concave and convex portions including pressing convex portions, which are pressed against the adjacent unit cell case at the time of restraint, and non-contact concave portions, which are not in contact with the unit cell case at the time of restraint, are formed on at least one side portion of end sides of the flat surface. The electrode terminals are disposed on bottom surfaces of the non-contact concave portions. With such a configuration, it is possible to provide a cell pack in which the sealing property of each unit cell is sufficiently ensured.

In a preferred embodiment of the cell pack disclosed herein, a gas discharge valve for discharging gas generated in the case is disposed on a bottom surface of the concave portion. Further, in a preferred embodiment, a liquid injection plug for closing a liquid injection hole for the electrolytic solution is disposed in the bottom surface of the concave portion.

DETAILED DESCRIPTION OF THE INVENTION

Figure 1:
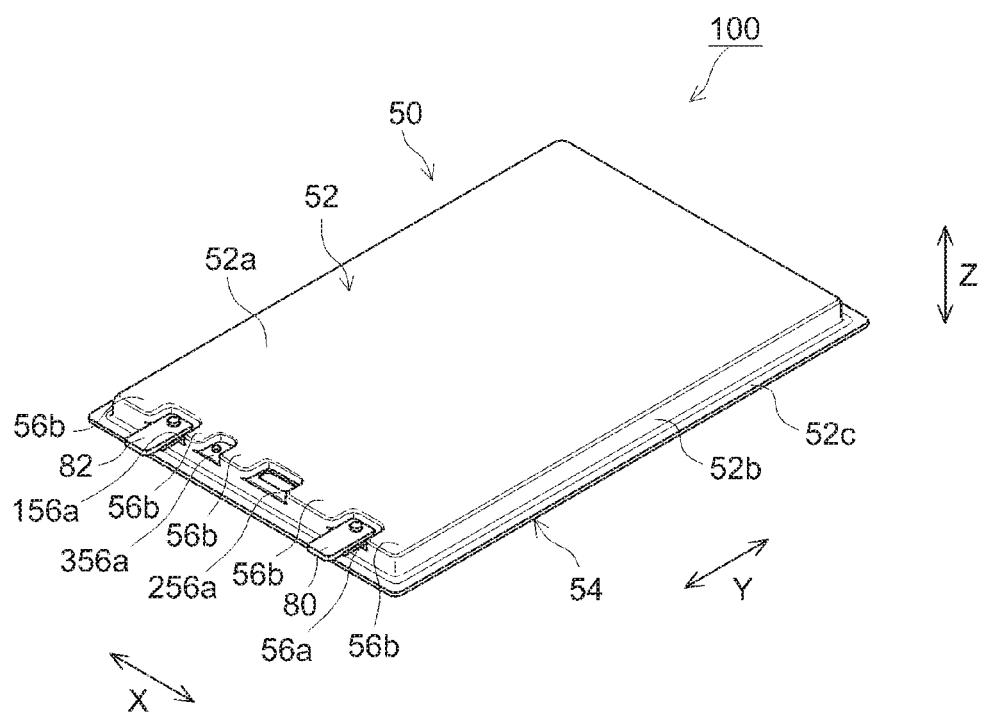
FIG. 1 is a perspective view schematically showing a sealed cell according to an embodiment of the present invention.

Embodiments of the present invention will be described below with reference to the drawings. Matters necessary for the implementation of the present invention (for example, the general configuration and manufacturing process of the electrode body which are not characterizing the present invention) which are other than the matters particularly mentioned in the present specification can be understood as design matters for a person skilled in the art which are based on the related art in the pertinent field. The present invention can be implemented based on the contents disclosed in this specification and common technical sense in the pertinent field. Further, in the following drawings, the same reference numerals are attached to members and parts that exhibit the same action. Further, the dimensional relationship (length, width, thickness, and the like) in each drawing does not reflect the actual dimensional relationship.

In the present specification, the term "unit cell" is used to refer to individual power storage elements that can be connected in series with each other to constitute a cell pack, and this term is inclusive of cells and capacitors of various compositions unless specified otherwise. Further, the term "secondary cell" generally refers to a cell that can be repeatedly charged, and this term is inclusive of the so-called storage cells such as lithium ion secondary cells and nickel hydride cells.

A power storage element constituting a lithium ion secondary cell is a typical example included in the "unit cell" referred to herein, and a lithium ion secondary cell module including a plurality of such unit cells is a typical example of the "cell pack" disclosed in the present specification.

The configuration of unit cells in the cell pack according to the present invention is not particularly limited as long as a chargeable/dischargeable secondary cell is used as the unit cell and the cell pack is formed by connecting a plurality of such unit cells in series. The configuration of a unit cell advantageous for the implementation of the present invention can be exemplified by a nickel hydride cell, an electric double layer capacitor, and the like. The configuration of a unit cell which is particularly advantageous for the implementation of the present invention is a lithium ion secondary cell. Since the lithium ion secondary cell is a secondary cell capable of realizing a high output with a high energy density, it is possible to construct a high-performance cell pack, in particular, a cell pack (cell module) to be installed on a vehicle.

The present invention will be described below in detail using a lithium ion secondary cell as an example of a cell configuration, but such a selection is not intended to be particularly limiting.

The cell pack is configured by arranging a plurality of chargeable/dischargeable cells in a predetermined direction. Similarly to the unit cells provided in the conventional cell packs, each of the plurality of unit cells is composed of predetermined cell constituent materials (an active material of each of the positive electrode and the negative electrode, a current collector of each of the positive electrode and the negative electrode, a separator, an electrolyte, and the like) and a box-shaped cell case that accommodates the electrode body.

Figure 2:
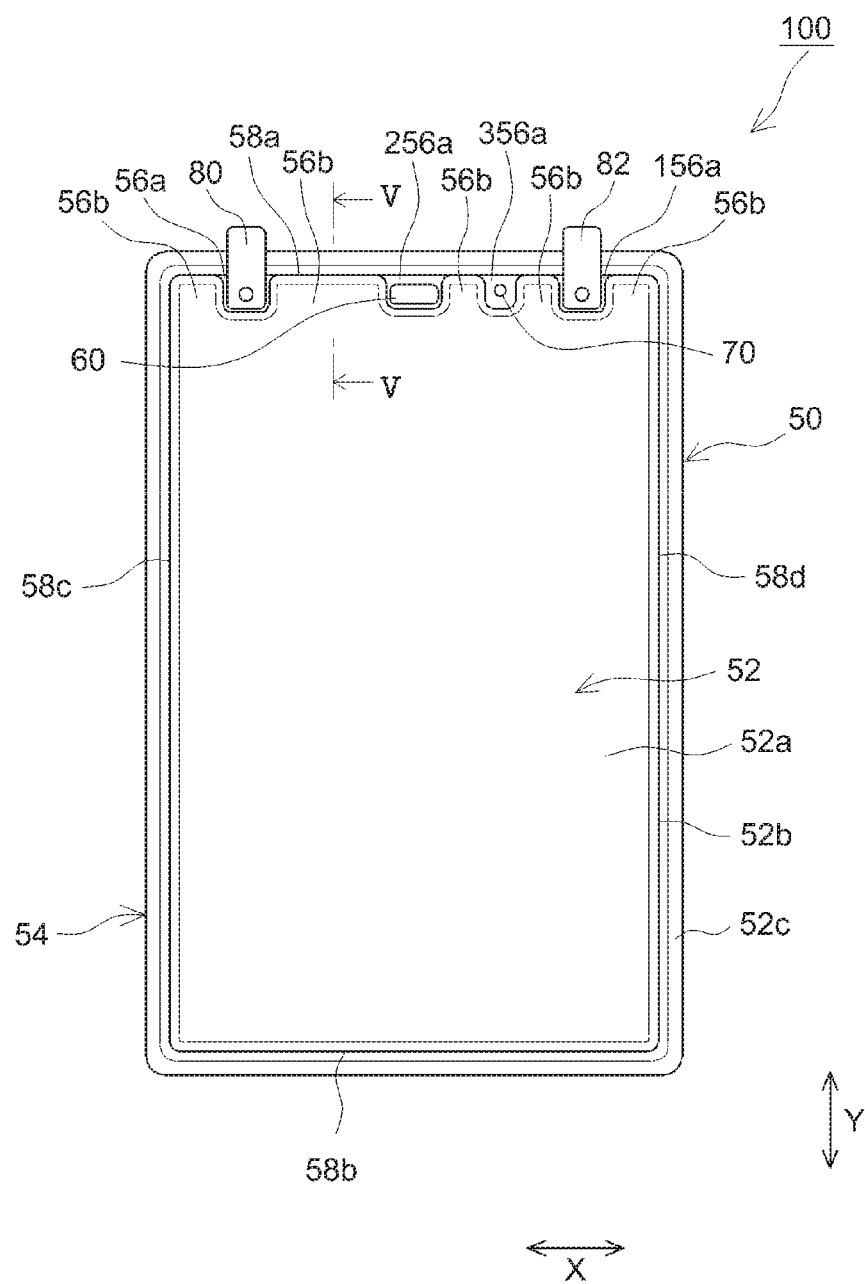
FIG. 2 is a plan view schematically showing a sealed cell according to an embodiment of the present invention.
Figure 3:
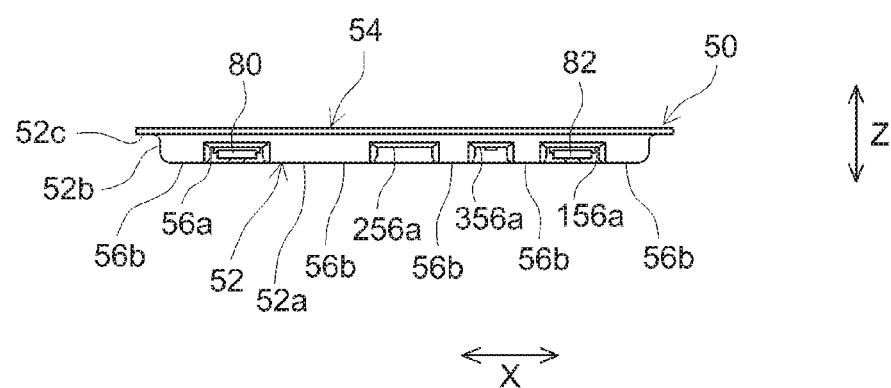
FIG. 3 is a side view schematically showing a sealed cell according to an embodiment of the present invention.
Figure 4:
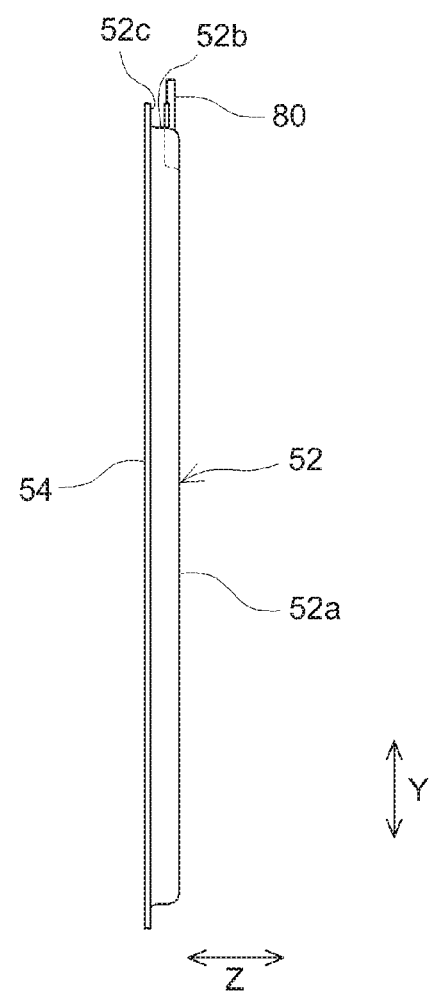
FIG. 4 is a side view schematically showing a sealed cell according to an embodiment of the present invention.
Figure 5:
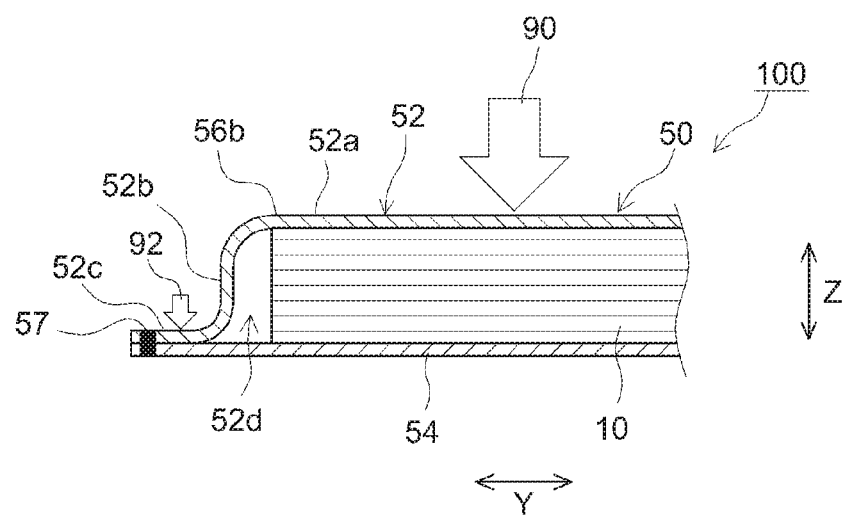
FIG. 5 is a cross-sectional view taken along a line V-V in FIG. 2.
Figure 6:
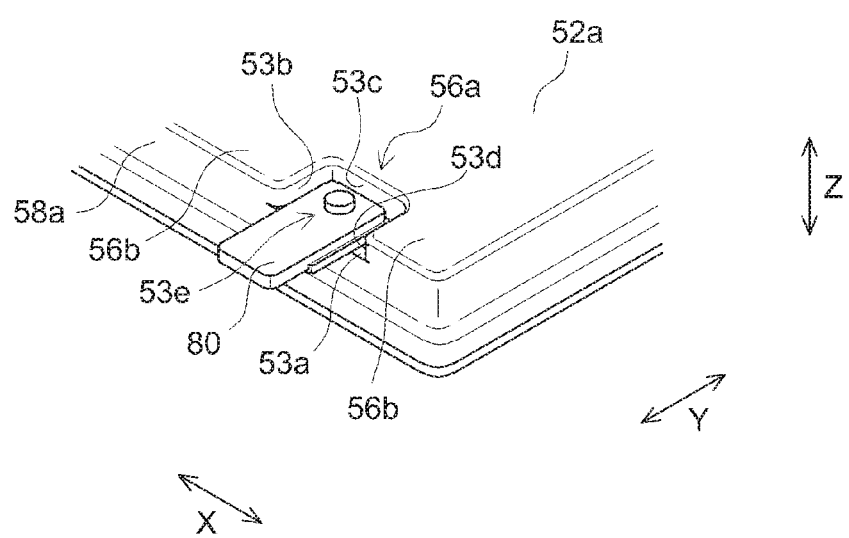
FIG. 6 is a principal enlarged view of the periphery of the positive electrode terminal in FIG. 1.
Figure 7:
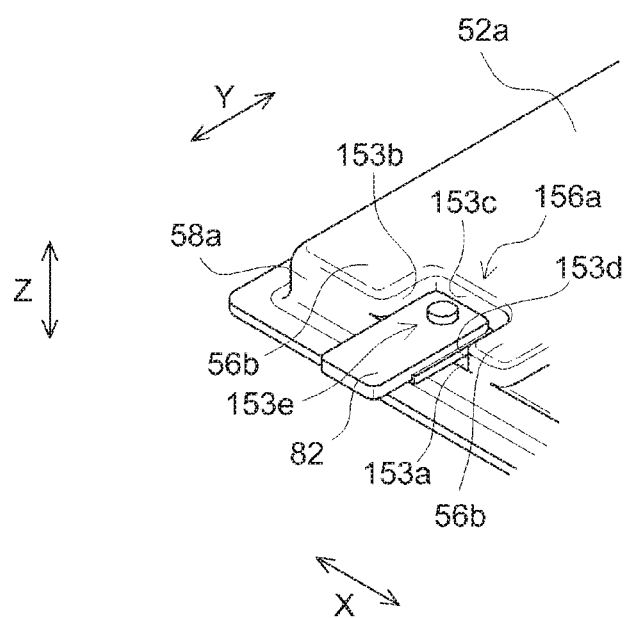
FIG. 7 is a principal enlarged view of the periphery of the negative electrode terminal in FIG. 1.
Figure 8:
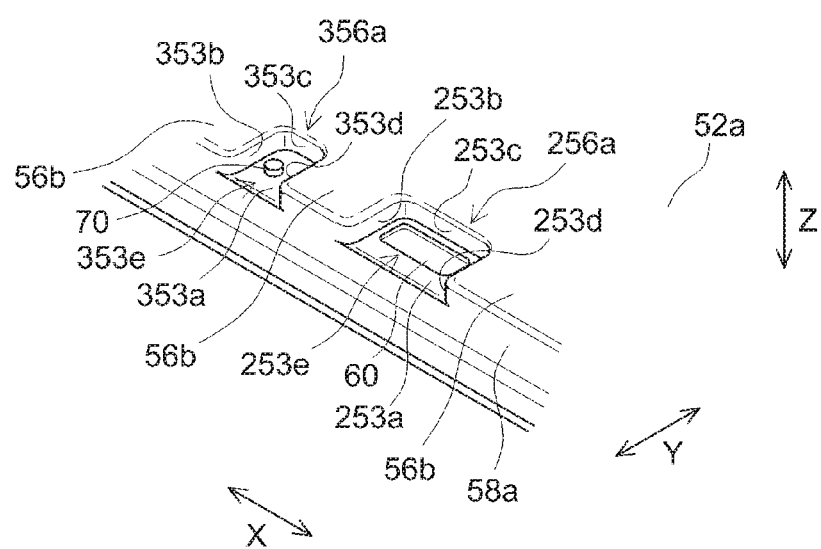
FIG. 8 is a principal enlarged view of the periphery of the gas discharge valve and the liquid injection plug in FIG. 1.
Figure 9:
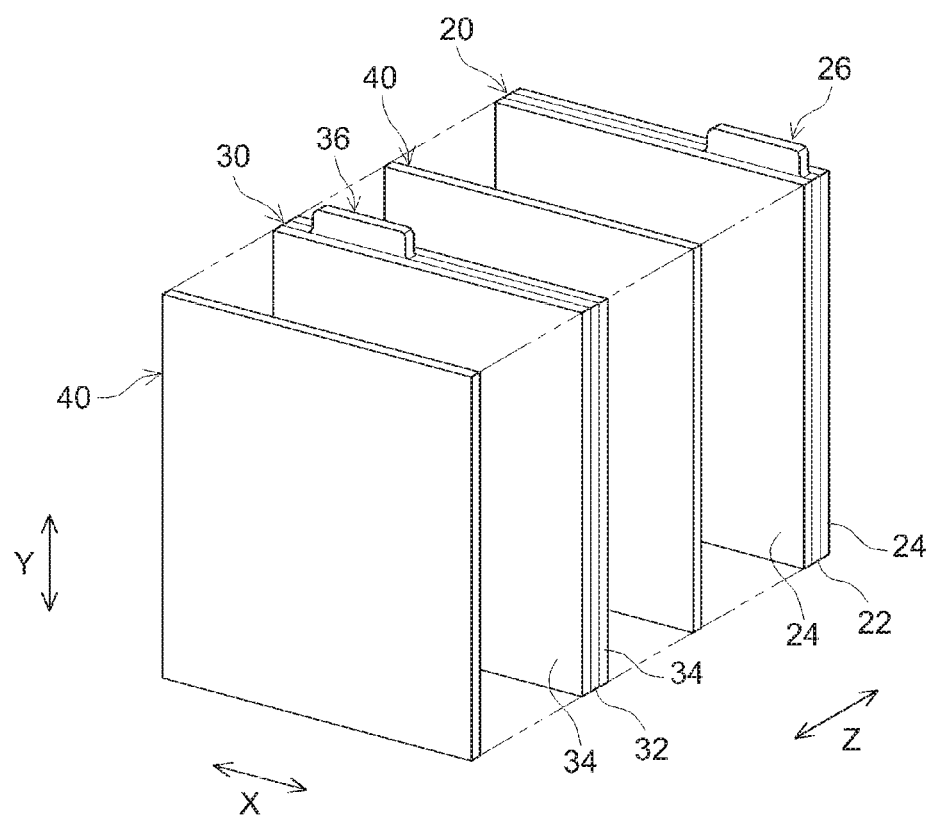
FIG. 9 is a view for explaining the positive electrode, negative electrode, and separator constituting the electrode body in each unit cell.

FIG. 1 is a perspective view of a unit cell (lithium ion secondary cell) 100 constituting a cell pack according to the present embodiment. FIG. 2 is a plan view. FIG. 3 is a side view. FIG. 4 is a side view. FIG. 5 is a schematic view taken along the cross section V-V in FIG. 2. FIGS. 6 to 8 are enlarged principal views of the unit cell shown in FIG. 1. FIG. 9 serves to explain a positive electrode 20, a negative electrode 30 and a separator 40 constituting an electrode body 10 in each unit cell 100. Hereinafter, an X direction is referred to as a lateral direction and a Y direction is referred to as a longitudinal direction along the contour of the unit cell 100, and a Z direction, which is a direction perpendicular to the X direction and the Y direction, is referred to as a thickness direction. The thickness direction Z corresponds to the direction (arrangement direction) in which the unit cells 100 are arranged in the cell pack. However, these are selected merely for the sake of convenience of explanation and do not limit the disposition mode of the lithium ion secondary cells 100.

As shown in FIGS. 1 to 9, the lithium ion secondary cell 100 includes a cell case 50, the electrode body 10, a gas discharge valve 60, a liquid injection plug 70, a positive electrode terminal 80, a negative electrode terminal 82, and an electrolyte which is not shown in the figure. The positive electrode terminal 80 is electrically connected to the positive electrode 20 of the electrode body 10 and led out to the outside of the cell case 50. The negative electrode terminal 82 is electrically connected to the negative electrode 30 of the electrode body 10 and led out to the outside of the cell case 50.

The cell case 50 is a container for accommodating the electrode body 10 and the electrolyte. In the present embodiment, the cell case 50 has an angular external shape (box-like rectangular parallelepiped shape). The cell case 50 includes a flat case main body 52 and a sealing plate 54. The case main body 52 is formed in a concave shape capable of accommodating the electrode body 10. In the case main body 52, the surface with the largest area (wide surface), among the surfaces constituting the case main body 52, is open. In this embodiment, one side of the case main body 52 in the thickness direction Z is open. Further, the case main body 52 has a flange portion 52c attached to the peripheral edge of an opening 52d (FIG. 5). A sealing plate 54 is a flat plate-shaped member that closes the opening 52d of the case main body 52. The sealing plate 54 is attached to the case main body 52 so as to cover the opening 52d of the case main body 52. The case main body 52 and the sealing plate 54 are disposed to face each other in the thickness direction Z with the electrode body 10 interposed therebetween. The peripheral edge portion of the opening 52d provided in the case main body 52 and the sealing plate 54 are joined to each other. In this embodiment, a flange portion 52c provided in the case main body 52 and the sealing plate 54 are joined by seal welding. As a result, the cell case 50 is sealed. A reference numeral 57 in FIG. 5 denotes a welded portion between the flange portion 52c and the sealing plate 54. The material of the cell case 50 is, for example, a metal material such as aluminum or steel. The thickness (wall thickness) of the cell case 50 can be set to, for example, 0.3 mm or more, typically 0.3 mm to 1 mm.

The concave case main body 52 has a flat surface 52a facing the sealing plate 54 with the electrode body 10 interposed therebetween and a side wall 52b rising from the flat surface 52a so as to surround the electrode body 10. As viewed from the thickness direction Z, the flat surface 52a has a rectangular shape formed by a first side 58a (FIG. 2), a second side 58b (FIG. 2) opposed to the first side 58a, a third side 58c (FIG. 2) orthogonal to the first side 58a, and a fourth side 58d orthogonal to the first side 58a and facing the third side 58c (FIG. 2). The side wall 52b is formed along the four sides (the first side 58a, the second side 58b, the third side 58c, and the fourth side 58d) of the flat surface 52a so as to surround the electrode body 10 disposed on the flat surface 52a. Further, the side wall 52b is formed so as to bridge (couple) the flange portion 52c attached to the peripheral edge of the opening 52d and the flat surface 52a.

Further, concave and convex portions including concave portions 56a, 156a. 256a, 356a recessed toward the inside of the case and convex portions 56b which are flush with the flat surface 52a (that is, not recessed toward the inside of the case) are formed in at least one side portion (here, the first side 58a portion) of the four end sides 58a, 58b, 58c, 58d of the flat surface 52a. In this embodiment, the four concave portions 56a, 156a. 256a, 356a are formed at predetermined intervals along the first side 58a of the flat surface 52a. The positive electrode terminal 80 is disposed on a bottom surface 53a (FIG. 6) of the concave portion 56a. Further, the negative electrode terminal 82 is disposed on a bottom surface 153a (FIG. 7) of the concave portion 156a.

In this embodiment, the positive electrode terminal 80 and the negative electrode terminal 82 are flat plate-shaped terminals. The positive electrode terminal 80 and the negative electrode terminal 82 are disposed in line symmetry with respect to the center line of the cell case 50 in the lateral direction X. In the thickness direction Z, the length (height) of the positive electrode terminal 80 is smaller than the depth of the concave portion 56a (the height from the bottom surface 53a to the flat surface 52a). Likewise, the length (height) of the negative electrode terminal 82 is smaller than the depth of the concave portion 156a (the height from the bottom surface 153a to the flat surface 52a). In other words, the positive electrode terminal 80 and the negative electrode terminal 82 disposed on the bottom surfaces 53a. 153a are disposed so as not to protrude toward the outside of the case beyond the flat surface 52a in the thickness direction Z. In the thickness direction Z, the length (height) of the positive electrode terminal 80 and the negative electrode terminal 82 can be set to, for example, 1 mm to 7 mm (typically 2 mm to 5 mm). Further, the concave portion 56a has three inner walls 53b, 53c, 53d (FIG. 6) rising from the bottom surface 53a so as to surround the three sides of the positive electrode terminal 80 with respect to the positive electrode terminal 80 disposed on the bottom surface 53a, and an opening 53e (FIG. 6) in which the inner wall is not formed and which opens to the outside of the case. Likewise, the concave portion 156a has three inner walls 153b, 153c, 153d (FIG. 7) rising from the bottom surface 153a so as to surround the three sides of the negative electrode terminal 82 with respect to the negative electrode terminal 82 disposed on the bottom surface 153a, and an opening 153e (FIG. 7) in which the inner wall is not formed and which opens to the outside of the case. In this embodiment, one surface of the inner wall constituting the concave portions 56a, 156a is open in the longitudinal direction Y. In the lateral direction X, the length (width) of the positive electrode terminal 80 is substantially equal to the distance between the inner wall 53b and the inner wall 53d. In addition, in the longitudinal direction Y, the length (width) of the positive electrode terminal 80 is larger than the length from the inner wall 53c to the first side 58a. In other words, in the longitudinal direction Y, the positive electrode terminal 80 is provided so as to protrude toward the outside of the case beyond the first side 58a of the flat surface 52a through the opening 53e. Likewise, in the lateral direction X, the length (width) of the negative electrode terminal 82 is substantially equal to the distance between the inner wall 153b and the inner wall 153d. Further, in the longitudinal direction Y, the length (width) of the negative electrode terminal 82 is larger than the length from the inner wall 153c to the first side 58a. In other words, in the longitudinal direction Y, the negative electrode terminal 82 is provided so as to protrude toward the outside of the case beyond the first side 58a of the flat surface 52a through the opening 153e.

The gas discharge valve 60 is configured to discharge the gas generated in the cell case 50 when the pressure inside the cell case 50 reaches a predetermined value. Similarly to the positive electrode terminal 80 and the negative electrode terminal 82, the gas discharge valve 60 is provided on a bottom surface 253a (FIG. 8) of a concave portion 256a provided along the first side 58a of the flat surface 52a. In this embodiment, the gas discharge valve 60 is disposed on the center line of the cell case 50 in the lateral direction X. The gas discharge valve 60 disposed on the bottom surface 253a is disposed so as not to protrude toward the outside of the case in the thickness direction Z beyond the flat surface 52a. The concave portion 256a has three inner walls 253b. 253c, 253d (FIG. 8) rising from the bottom surface 253a so as to surround the three sides of the gas discharge valve 60 with respect to the gas discharge valve 60 disposed on the bottom surface 253a, and an opening 253e (FIG. 8) in which the inner wall is not formed and which is open toward the outside of the case. In this embodiment, one surface of the inner wall constituting the concave portion 256a is open in the longitudinal direction Y. In this configuration, when the gas discharge valve 60 is opened by the rise in the internal pressure of the case, splash of the electrolytic solution ejected from the gas discharge valve 60 flies to the outside of the case through the opening 53e.

The configuration of the gas discharge valve 60 is not particularly limited as long as the gas discharge valve is capable of discharging the gas generated in the cell case 50 when the internal pressure of the cell reaches a predetermined value. For example, the gas discharge valve 60 may have a structure in which a thin portion is provided in a part of the cell case 50. A cutout groove may be formed in the thinned portion. In this configuration, when the internal pressure of the cell reaches a predetermined value, the thin portion breaks. As a result, the gas generated in the cell can be discharged to the outside of the cell through the gas discharge valve 60. Alternatively, the gas discharge valve 60 may be provided with a valve body that breaks when the internal pressure of the cell reaches a predetermined value. In this configuration, when the pressure in the cell reaches a predetermined value, the valve body breaks. As a result, the gas generated in the cell can be discharged to the outside of the cell through the gas discharge valve 60.

The liquid injection plug 70 for closing the liquid injection hole for injecting a liquid electrolyte (electrolytic solution) is provided on a bottom surface 353a (FIG. 8) of a concave portion 356a provided along the first side 58a of the flat surface 52a. The liquid injection plug 70 is disposed at a position shifted from the center line of the cell case 50 toward the fourth side 58d in the lateral direction X. The liquid injection plug 70 disposed on the bottom surface 353a is disposed so as not to protrude toward the outside of the case in the thickness direction Z beyond the flat surface 52a. Further, the concave portion 356a has three inner walls 353b. 353c, 353d (FIG. 8) rising from the bottom surface 353a so as to surround the three sides of the liquid injection plug 70 with respect to the liquid injection plug 70 disposed on the bottom surface 353a, and an opening 353e (FIG. 8) in which the inner wall is not formed and which is opened toward the outside of the case. In this embodiment, one surface of the inner wall constituting the concave portion 356a is open in the longitudinal direction Y.

The electrode body 10 and the electrolyte are accommodated inside the cell case 50. As shown in FIG. 9, in this configuration, the electrode body 10 is a stack-type electrode body (stacked electrode body). The electrode body 10 includes a plurality of rectangular positive electrode sheets 20 and a plurality of rectangular negative electrode sheets 30. The positive electrode sheets 20 and the negative electrode sheets 30 are stacked in a state of being insulated by a separator 40. In this configuration, the stacking direction of the electrode body 10 is the thickness direction Z.

The positive electrode sheet 20 includes a positive electrode current collector 22 and a positive electrode active material layer 24 formed on the surface thereof. For example, a metal foil suitable for a positive electrode can be advantageously used as the positive electrode current collector 22. In this embodiment, an aluminum foil is used as the positive electrode current collector 22. In the example shown in the figure, the positive electrode active material layer 24 is held on both sides of the positive electrode current collector 22. Further, in the lateral direction X and the longitudinal direction, the positive electrode active material layer 24 is formed to have the same width as the total width of the positive electrode current collector 22.

The positive electrode active material layer 24 includes a positive electrode active material, a conductive material, and a binder. For the positive electrode active material, one or two or more substances conventionally used for lithium ion secondary cells can be used without particular limitation. As an example, a lithium transition metal complex oxide of a layered structure which is represented by a general formula LiMeO$_2$ (Me includes at least one transition metal element such as Ni, Co, Mn, and the like), such as LiNi$_{1/3}$Co$_{1/3}$Mn$_{1/3}$O$_2$ (lithium nickel cobalt manganese complex oxide), LiNiO$_2$ (lithium nickel complex oxide), or LiCoO$_2$ (lithium cobalt complex oxide) can be used. In addition to the above-described positive electrode active material, the positive electrode active material layer 24 may include a conductive material such as acetylene black (AB), or a binder such as polyvinylidene fluoride (PVDF), styrene butadiene rubber (SBR).

The positive electrode sheet 20 has a protruding portion 26 on which the positive electrode active material layer 24 is not formed and which protrudes toward the outside beyond the portion where the positive electrode active material layer 24 is formed. Since the positive electrode active material layer 24 is not formed on the protruding portion 26, the positive electrode current collector 22 is exposed. A positive electrode current collecting tab 26 is formed by this protruding portion 26. The positive electrode current collecting tab 26 is extended from the end portion of the positive electrode active material layer 24.

The negative electrode sheet 30 includes a negative electrode current collector 32 and a negative electrode active material layer 34 formed on the surface thereof. For example, a metal foil suitable for a negative electrode can be advantageously used as the negative electrode current collector 32. In this embodiment, a copper foil is used as the negative electrode current collector 32. In the example shown in the figure, the negative electrode active material layer 34 is held on both sides of the negative electrode current collector 32. Further, in the lateral direction X and the longitudinal direction Y, the negative electrode active material layer 34 is formed to have the same width as the total width of the negative electrode current collector 32.

The negative electrode active material layer 34 includes a negative electrode active material, a thickener, a binder, and the like. For the negative electrode active material, one or two or more substances conventionally used for a lithium ion secondary cell can be used without particular limitation. Examples thereof include carbon-based materials such as graphite carbon and amorphous carbon, lithium transition metal oxides, lithium transition metal nitrides, and the like. In addition to the negative electrode active material, a binder such as polyvinylidene fluoride (PVDF), styrene butadiene rubber (SBR), and the like, or a thickener such as carboxymethyl cellulose (CMC) and the like can be added.

The negative electrode sheet 30 has a protruding portion 36 on which the negative electrode active material layer 34 is not formed and which protrudes toward the outside beyond the portion where the negative electrode active material layer 34 is formed. Since the negative electrode active material layer 34 is not formed on the protruding portion 36, the negative electrode current collector 32 is exposed. A negative electrode current collecting tab 36 is formed by this protruding portion 36.

The separator 40 is a member that separates the positive electrode sheet 20 and the negative electrode sheet 30. In this example, the separator 40 is configured of a sheet material of a predetermined width having a plurality of minute holes. For the separator 40, for example, a separator having a single layer structure configured of a porous polyolefin resin or a separator having a stacked structure can be used.

The stacked electrode body 10 is formed by stacking a plurality of positive electrode sheets 20, a plurality of negative electrode sheets 30, and a plurality of separators 40. Specifically, the positive electrode sheets 20 and the negative electrode sheets 30 are alternately and repeatedly stacked in the stacking direction (here, the thickness direction Z) with the separator 40 interposed therebetween. Further, the stacked electrode body 10 has a stacked portion in which the positive electrode active material layer 24 and the negative electrode active material layer 34 are overlapped with the separator 40 interposed therebetween. This stacked portion is a portion where charge carriers (here, lithium ions) are exchanged between the positive electrode active material layer 24 and the negative electrode active material layer 34 through the separator 40, this portion contributing to charge and discharge of the cell 100.

As shown in FIGS. 1 to 9, the stacked electrode body 10 is attached to electrode terminals 80, 82 disposed on the flat surface 52a (bottom surfaces 53a. 153a of the concave portions 56a, 156a) of the cell case 50. The stacked electrode body 10 is inserted into the case main body 52 from the opening 52d (FIG. 5) of the case main body 52. The stacked electrode body 10 is accommodated in the cell case 50 in a state where the stacking direction of the electrode body 10 coincides with the thickness direction Z (a state where the positive electrode, the negative electrode, and the separator are parallel to the sealing plate 54). Further, in the stacked electrode body 10, the positive electrode current collecting tabs 26 of the plurality of repeatedly stacked positive electrode sheets 20 are stacked in the stacking direction of the stacked electrode body 10 and protrude from the end surface of the stacked portion. The plurality of protruding positive electrode current collecting tabs 26 are gathered in the stacking direction, and a positive electrode lead terminal (not shown) is attached to the gathering portion thereof and electrically connected to the positive electrode terminal 80. Furthermore, in the stacked electrode body 10, the negative electrode current collecting tabs 36 of the plurality of repetitively stacked negative electrode sheets 30 are stacked in the stacking direction of the stacked electrode body 10 and protrude from the end surface of the stacked portion. The plurality of protruding negative electrode current collecting tabs 36 are gathered in the stacking direction, and a negative electrode lead terminal (not shown) is attached to the gathering portion thereof and electrically connected to the negative electrode terminal 82. The stacked electrode body 10 is accommodated in the flat inner space of the case main body 52 from the opening 52d of the case main body 52. The opening 52d of the case main body 52 is closed by the sealing plate 54 after the stacked electrode body 10 is accommodated therein.

The electrolyte is typically in a liquid state at ordinary temperature (for example, 25° C.), and preferably always exhibits a liquid state within the usage temperature range (for example, from −20° C. to 60° C.). An electrolyte obtained by dissolving or dispersing a supporting salt (for example, a lithium salt, a sodium salt, a magnesium salt, and the like; a lithium salt in a lithium ion secondary cell) in a nonaqueous solvent can be advantageously used. A supporting salt same as that of a general lithium ion secondary cell can be appropriately selected and used. For example, a lithium salt such as $LiPF_6$, $LiBF_4$, $LiClO_4$, $LiAsF_6$, $Li(CF_3SO_2)_2N$, $LiCF_3SO_3$ and the like can be used. Among these, $LiPF_6$ can be advantageously used.

Various organic solvents such as carbonates, ethers, esters, nitriles, sulfones, and lactones used in general lithium ion secondary cells can be used without particular limitation as the nonaqueous solvent. Specific examples thereof include ethylene carbonate (EC), propylene carbonate (PC), diethyl carbonate (DEC), dimethyl carbonate (DMC), ethyl methyl carbonate (EMC) and the like.

Figure 10:
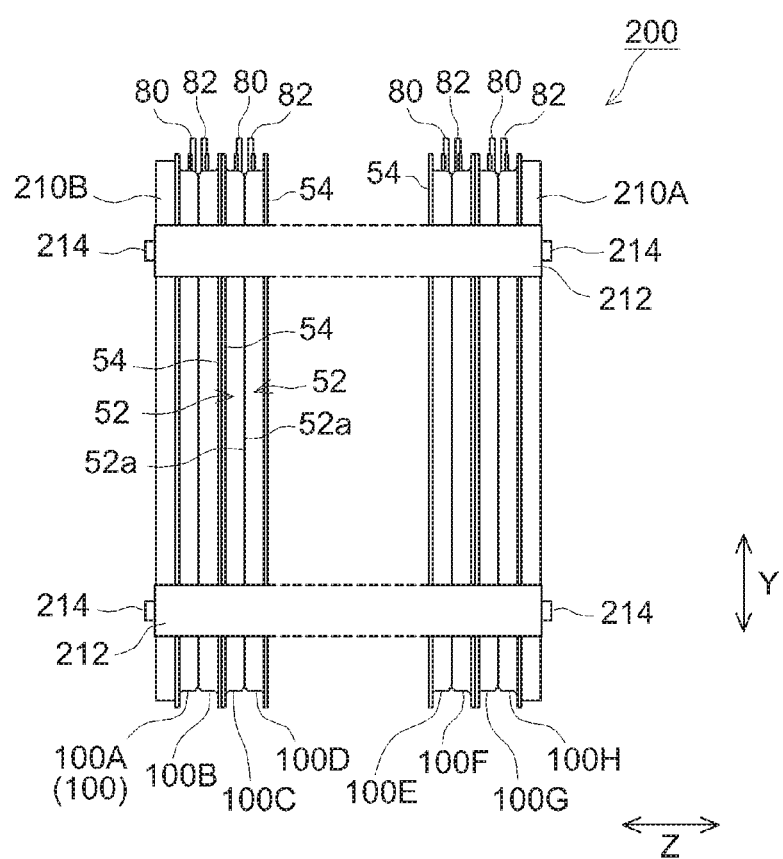
FIG. 10 is a side view schematically showing a cell pack according to an embodiment of the present invention.

A cell pack 200 according to this embodiment will be described hereinbelow with reference to FIG. 10. FIG. 10 is a side view of the cell pack 200.

As shown in FIG. 10, the cell pack 200 is configured by connecting in series a plurality (typically 6 or more (for example, 6 to 100), preferably 30 or more, more preferably 50 or more, and still more preferably 60 or more) of unit cells 100. The plurality of unit cells 100 are arranged in a direction (that is, the thickness direction Z) in which the case main body 52 and the sealing plate 54 are overlapped with each other in the cell case 50 included in each of the unit cells 100. In this embodiment, the cell case 50 of each of the unit cells 100 is provided with the positive electrode terminal 80 electrically connected to the positive electrode 20 of the electrode body 10 and the negative electrode terminal 82 electrically connected to the negative electrode 30. Between the adjacent unit cells 100, one positive electrode terminal 80 and the other negative electrode terminal 82 are electrically connected by a terminal-to-terminal connector (not shown). Specifically, the plurality of unit cells 100 are arranged such that the positive electrode terminals 80 and the negative electrode terminals 82 are disposed alternately (so that the positive electrode terminal 80 and the negative electrode terminal 82 of the adjacent unit cells 100 are adjacent to each other), and are arranged in a state in which the orientations of the cells are alternately reversed. Therefore, the plurality of unit cells 100 are arranged by alternately, one by one, reversing the orientations so that the case main bodies 52 of the cell cases 50 of the unit cells 100 are opposed to each other and the sealing plates 54 are opposed to each other.

A restraining member for collectively restraining the plurality of unit cells 100 is disposed around the arranged unit cells 100. That is, a pair of end plates 210A, 210B is disposed at both ends (further on the outside of the outermost cell cells 100A, 100H) in the arrangement direction Z of the plurality of unit cells 100. A restraining band 212 is attached to the pair of end plates 210A, 210B so as to bridge the pair of end plates 210A, 210B. By clamping and fixing the end portions of the restraining band 212 to the pair of end plates 210A, 210B by the screws 214, the unit cell group can be restrained in the arrangement direction. A restraining load (surface pressure) in the tightening direction (that is, the arrangement direction) is applied to the cell case (the flat surface 52a of the case main body 52 and the sealing plate 54) of each unit cell 100 at a level corresponding to the degree of tightening of the restraining band 212. In this manner, the cell pack 200 can be constructed.

In the cell pack 200, as shown in FIGS. 1 to 10, the case main body 52 provided in each of the plurality of unit cells 100 has the flat surfaces 52a which are mutually opposing surfaces of the adjacent unit cell cases and which receive a load applied at the time of restraint, flange portions 52c attached to the peripheral edge of the opening 52d, and the side wall 52b rising from the flat surface 52a so as to surround the electrode body 10. The side wall 52b bridges the flat surface 52a and the flange portion 52c. The flange portion 52c provided on the case main body 52 and the sealing plate 54 are joined to each other by seal welding. Concave and convex portions including the concave portions 56a, 156a recessed toward the inside of the case and the convex portions 56b flush with the flat surface 52a are formed on at least one side (here, the first side 58a) portion of the end sides of the flat surface 52a. Therefore, the convex portions 56b are brought into contact and pressed against the adjacent unit cell cases at the time of restraint (hereinafter also referred to as "pressing convex portions"). Meanwhile, the concave portions 56a. 156a are not in contact with the adjacent unit cell cases at the time of restraint (hereinafter also referred to as "non-contact concave portions"). Further, the electrode terminals 80, 82 are disposed on the bottom surfaces 53a, 153a of the non-contact concave portions 56a, 156a which are not in contact with the adjacent unit cell cases at the time of restraint.

Figure 11:
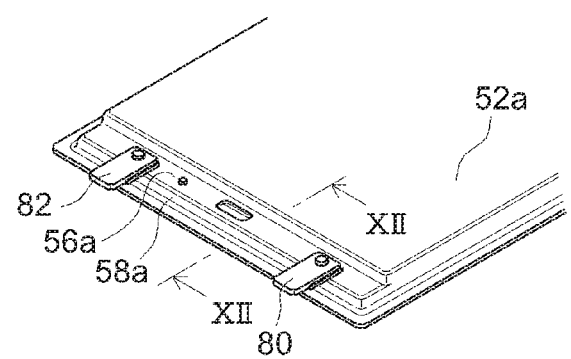
FIG. 11 is a perspective view schematically showing a conventional sealed cell.
Figure 12:
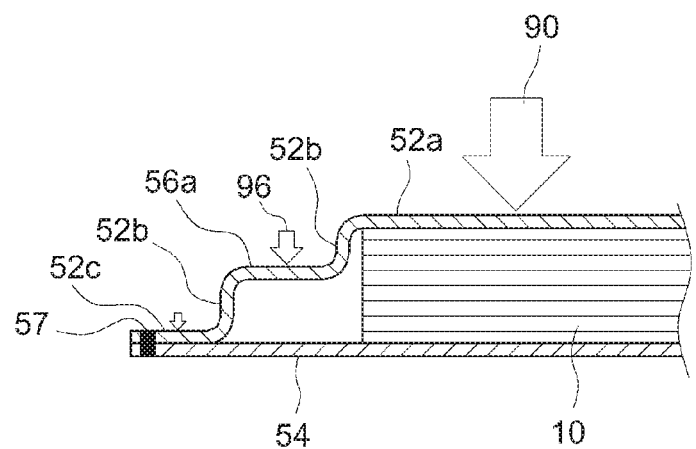
FIG. 12 is a cross-sectional view schematically showing the conventional sealed cell.

With such a configuration, it is possible to suppress a sealing failure that occurs when the non-contact concave portion 56a in which the electrode terminals 80, 82 are disposed is provided continuously in a band shape along one side (here, the first side 58a) of the flat surface 52a as in the conventional cell structure shown in FIG. 11. Specifically, where the non-contact concave portion 56a in which the electrode terminals 80, 82 are disposed is provided continuously in a band shape along one side of the flat surface 52a, when the restraining load 90 is applied to the flat surface 52a of the case main body 52, as shown in FIG. 12 (cross section taken along the line XII-XII in FIG. 11), the restraining load is dispersed also to the non-contact concave portion 56a (see an arrow 96), so that the restraining load is unlikely to be transmitted through the side wall 52b to the joint portion 57 between the flange portion 52c and the sealing plate 54. Therefore, the joint portion 57 between the flange portion 52c and the sealing plate 54 cannot be effectively suppressed at a portion (here, the first side 58a) where the electrode terminals 80, 82 are taken from the inside of the case to the outside of the case, and the sealing property and pressure resistance performance may not be sufficiently ensured.

Meanwhile, as indicated hereinabove, with the cell pack 200 configured as described above, as shown in FIG. 5, concave and convex portions including pressing convex portions 56b which are pressed against the adjacent unit cell case at the time of restraint and the non-contact concave portions 56a. 156a which are not in contact with the unit cell case at the time of restraint are formed on at least one side portion of the edge sides of the flat surface 52a, and the electrode terminals 80, 82 are disposed on the bottom surfaces 53a, 153a of the non-contact concave portions 56a, 156a. Therefore, when the restraining load 90 is applied to the flat surface 52a of the case main body 52, the pressing convex portions 56b which are flush with the flat surface 52a are pressed against the adjacent unit cell case, whereby the restraining load can be appropriately transmitted through the side wall 52b to the joint portion 57 between the flange portion 52c and the sealing plate 54 (see an arrow 92). Therefore, the sealing property and pressure resistance performance at the joint portion 57 between the flange portion 52c and the sealing plate 54 are effectively enhanced in one side (here, the first side 58a) portion where the electrode terminals 80, 82 are taken from the inside of the case to the outside of the case. This makes it possible to realize the cell pack 200 in which the sealing property and pressure resistance performance of each unit cell 100 are sufficiently ensured, as compared with the conventional case.

In a preferred embodiment, the total length of the concave portions 56a, 156a, 256a, 356a (that is, the total length of the four concave portions 56a, 156a, 256a. 356a in which the electrode terminals 80, 82, the gas discharge valve 60, and the liquid injection plug 70 are respectively disposed) in the lateral direction X can be 0.7 L or less (for example, 0.3 L to 0.7 L), where L is the length (total length) L of the flat surface 52a. The total length of the concave portions 56a, 156a, 256a, 356a is preferably 0.6 L or less, and more preferably 0.5 L or less. Within this range of the total length of the concave portions 56a, 156a, 256a, 356a, the sealing property and pressure resistance performance at the joint portion 57 between the flange portion 52c and the sealing plate 54 can be effectively enhanced in one side (here, the first side 58a) portion where the electrode terminals 80, 82 are taken from the inside of the case to the outside of the case.

Further, with the cell pack 200, the non-contact concave portion 56a has three inner walls 53b, 53c, 53d (FIG. 6) rising from the bottom surface 53a, 153a so as to surround the three sides of the positive electrode terminal 80 with respect to the positive electrode terminal 80 disposed on the bottom surface 53a, and the opening 53e (FIG. 6) in which the inner wall is not formed and which opens toward the outside of the case. In the lateral direction X, the length (width) of the positive electrode terminal 80 is substantially equal to the distance between the inner wall 53b and the inner wall 53d. In addition, in the longitudinal direction Y, the length (width) of the positive electrode terminal 80 is larger than the length from the inner wall 53c to the first side 58a. Thus, in the longitudinal direction Y, the positive electrode terminal 80 can be provided so as to protrude toward the outside of the case beyond the first side 58a of the flat surface 52a through the opening 53e, and assemblability in cell pack production (for example, when the unit cell terminals are to be connected with a bus bar or the like) is improved. Further, since the non-contact concave portion 56a is formed along the outer shape of the positive electrode terminal 80, the area of the pressing convex portion 56b is made relatively large and the load can be efficiently transmitted to the joint portion 57 between the flange portion 52c and the sealing plate 54. Therefore, the sealing property can be more effectively enhanced.

In the above embodiment, the length (height) of the positive electrode terminal 80 in the thickness direction Z is smaller than the depth (the height from the bottom surface 53a to the flat surface 52a) of the concave portion 56a. In other words, the positive electrode terminal 80 disposed on the bottom surface 53a is disposed so as not to protrude toward the outside of the case in the thickness direction Z beyond the flat surface 52a. In this way, it is possible to transmit appropriately the load applied to the flat surface 52a and the pressing convex portion 56b to the joint portion 57 between the flange portion 52c and the sealing plate 54, and the sealing property can be more effectively enhanced.

Further, in the above embodiment, the gas discharge valve 60 for discharging the gas generated in the case is disposed on the bottom surface 253a of the non-contact concave portion 256a. In this way, it is possible to realize a cell structure in which the sealing property is sufficiently ensured at one side (herein, the first side 58a) portion of the flat surface 52a on which the gas discharge valve 60 is disposed. Further, since the pressure resistance performance of the one side (herein, the first side 58a) portion is enhanced, deformation of the gas discharge valve 60 can be effectively suppressed, and erroneous operation of the discharge valve can be suppressed. Further, in the above embodiment, the non-contact concave portion 256a has three inner walls 253b, 253c, 253d (FIG. 8) rising from the bottom surface 253a so as to surround the three sides of the gas discharge valve 60 with respect to the gas discharge valve 60 disposed on the bottom surface 253a, and the opening 253e (FIG. 8) in which the inner wall is not formed and which is open toward the outside of the case. In this way, when the gas discharge valve 60 is opened by the rise in the internal pressure of the case, the inner walls 253b, 253c, 253d of the concave portion 256a can prevent the splash of the electrolytic solution ejected from the gas discharge valve 60 from diffusing in a wide range, and the splash of the electrolytic solution can be discharged from the opening 253e which is open toward the outside of the case. Therefore, it is possible to appropriately prevent the case from being deteriorated by the electrolytic solution ejected from the gas discharge valve 60, or the occurrence of an external short circuit.

Further, in the above embodiment, the liquid injection plug 70 that closes the liquid injection hole for the electrolytic solution is disposed on the bottom surface 353a of the non-contact concave portion 356a. In this way, it is possible to realize a cell structure in which the sealing property is sufficiently ensured at one side (here, the first side 58a) portion of the flat surface 52a on which the liquid injection plug 70 is disposed. Further, since the pressure resistance performance of the one side (here, the first side 58a) portion is enhanced, deformation and breakage of the liquid injection plug 70 can be effectively suppressed, and the sealing property of the cell can be satisfactorily maintained.

In the above embodiment, the cell case 50 has the concave case main body 52 which is open at one end, and the sealing plate 54 closing the opening 52d of the case main body 52. The plurality of unit cells 100 are arranged by alternately, one by one, reversing the orientations so that the case main bodies 52 of the cell cases 50 of the unit cells 100 are opposed to each other and the sealing plates 54 are opposed to each other. In this way, for example, an operator can assemble, even without paying special attention, each unit cell 100 in a preset correct orientation (that is, a state in which the orientations of the unit cell 100 are alternately reversed so that the positive electrode terminals 80 and the negative electrode terminals 82 of the adjacent unit cells 100 are adjacent to each other), and the work efficiency when assembling the cell pack 200 is improved.

Further, with the cell pack 200, one of the case main bodies 52 of the unit cells 100 is open in the thickness direction Z. By providing the opening 52d in the thickness direction Z of the case main body 52 as described above, it is possible to widen the opening as compared with the configuration in which the case main body 52 is open in the lateral direction X or the longitudinal direction Y. Therefore, even if the thickness of the unit cell 100 is reduced by reducing the thickness of the case main body 52 in the thickness direction Z, the electrode body 10 can be easily accommodated (inserted) in the cell case 50. In a preferred embodiment, the size of each unit cell 100 constituting the cell pack 200 in the thickness direction Z is smaller than the size in the lateral direction X and the longitudinal direction Y. In the illustrated example, the size of the unit cell 100 in the lateral direction X is smaller than the size in the longitudinal direction Y. Further, the size of the unit cell 100 in the thickness direction Z is smaller than the size in the lateral direction X. For example, the size of the unit cell 100 in the thickness direction Z is 1/10 or less, and typically can be 1/20 (for example, 1/30 or less) of the size in the lateral direction X. The size of the unit cell 100 in the thickness direction Z may be set to, for example, 1 mm to 20 mm (typically 5 mm to 10 mm). The size of the unit cell 100 in the lateral direction X may be set to, for example, 10 cm to 40 cm (typically 15 cm to 30 cm). In such a large and thin unit cell 100, the internal pressure receiving area is large (and, in turn, the rigidity is low) and the joint portion 57 between the flange portion 52c and the sealing member 54 is likely to be deformed due to the rise of the internal pressure (the sealing property is, therefore, difficult to ensure). Therefore, the effect of improving the sealing property by using this configuration can be exhibited more satisfactorily.

The present invention has been described in detail, but the above-described embodiments and examples are merely exemplary, and the invention disclosed herein is inclusive of various changes and modifications of the above-described specific examples.

For example, the above-described embodiment exemplifies the configuration having the concave case main body 52 having one end opened and a flat plate-like sealing member 54 for closing the opening 52d of the case main body 52, but the sealing member 54 is not limited to the flat plate shape. For example, the sealing member 54 may be a concave sealing member with one end opened. Further, the sealing member 54 may have a flange portion at the peripheral edge of the opening. In this configuration, the cell can be sealed by overlapping the opening of the sealing member with the opening 52d of the case main body 52 and joining the peripheral edge portions (flange portions) to each other.

Figure 13:
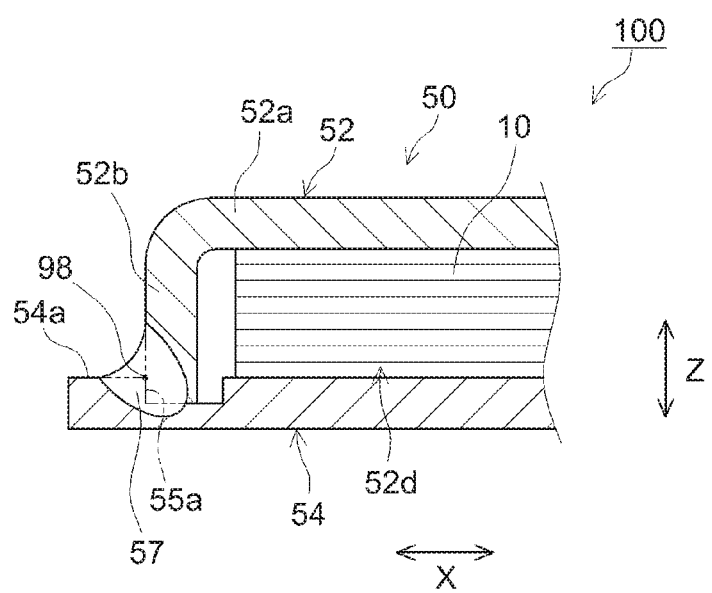
FIG. 13 is a cross-sectional view schematically showing a sealed cell according to another embodiment.
Figure 14:
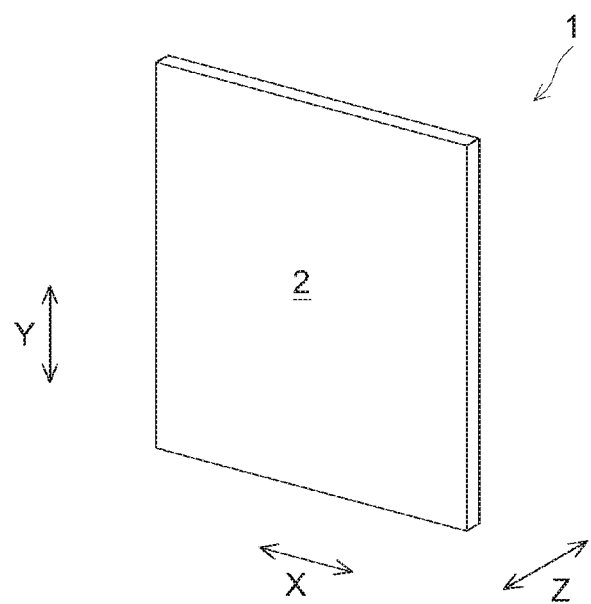
FIG. 14 is a view for explaining a thinned unit cell.

Further, the above-described embodiment exemplifies the configuration in which the flange portion 52c is provided on the peripheral edge of the opening 52d of the case main body 52, and the flange portion 52c and the sealing member 54 are joined to each other. However, this joining form of the case main body 52 and the sealing member 54 is not limiting. In the sealed cell disclosed here, it suffices that the peripheral edge portion of the opening 52d provided in the case main body 52 and the sealing member 54 are joined to each other. For example, the configuration shown in FIG. 13 may be used in which the convex portion 54a protruding toward the case main body 52 side on the peripheral edge portion of the sealing plate 54 is provided along the side wall of the case main body, the side surface 55a facing the inside of the convex portion 54a in the sealing plate 54 is overlapped to be in contact with the outer peripheral surface of the side wall 52b of the case main body 52, and a joint line 98 between the side surface 55a facing the inside of the convex portion 54a and the outer peripheral surface of the side wall 52b of the case main body 52 is welded. Even in such a configuration, an appropriate load can be applied to the joint portion 57 between the case main body 52 and the sealing plate 54, and the aforementioned action and effect can be obtained.

Further, the above-described embodiment exemplifies the configuration in which the positive electrode terminal 80, the negative electrode terminal 82, the gas discharge valve 60, and the liquid injection plug 70 are provided on the same side (here, the first side 58a) portion of the flat surface 52a, but this configuration is not limiting. For example, the positive electrode terminal 80, the negative electrode terminal 82, the gas discharge valve 60, and the liquid injection plug 70 may be provided on different side portions of the flat surface 52a. Where the positive electrode terminal 80, the negative electrode terminal 82, the gas discharge valve 60, and the liquid injection plug 70 are provided on different side portions of the flat surface 52a, satisfactory sealing property and pressure resistance performance can be ensured by making concave portions only in the arrangement positions thereof.

In addition, the suitable application object of the technique disclosed herein is not limited to the above-described stacked electrode body 10. For example, the technique may be applied to a wound electrode body in which the positive electrode current collector 22 and the negative electrode current collector 32 are band-shaped sheet materials, the positive electrode current collector 22 and the negative electrode current collector 32 are aligned in the longitudinal direction, the positive electrode active material layer 24 and the negative electrode active material layer 34 are disposed to oppose each other with the separator 40 interposed therebetween, and winding is performed around a winding axis. The above-described effect can be also obtained with such a configuration.

The cell pack 200 can be used for various purposes. For example, the cell pack can be advantageously used as a power source (driving power source) for a motor installed in a vehicle. Types of vehicles are not particularly limited, and typically include automobiles such as plug-in hybrid vehicles (PHV), hybrid vehicles (HV), electric vehicles (EV), and the like.

What is claimed is:

1. A sealed cell comprising:
an electrode body that includes a positive electrode and a negative electrode;
an angular case that accommodates the electrode body and an electrolytic solution; and
electrode terminals that are electrically connected to the electrode body and drawn to an outside of the angular case, wherein
the angular case includes a concave case main body having an opening and a sealing member attached so as to cover the opening of the concave case main body;
the concave case main body has a flat surface opposed to the sealing member, with the electrode body interposed therebetween, and a side wall rising from the flat surface so as to surround the electrode body;
a peripheral edge portion of the opening provided in the concave case main body and the sealing member are joined to each other by seal welding;
a portion of the side wall includes at least two concave portions, which are recessed toward an inside of the angular case, and a convex portion, which is not recessed toward the inside of the angular case and is flush with the flat surface; and
each of the electrode terminals is respectively disposed on a bottom surface of each of the at least two concave portions, wherein
each of the at least two concave portions has three inner walls rising from the bottom surface so as to surround three sides of the electrode terminal disposed on the bottom surface, and an opening in which an inner wall is not formed and which opens to the outside of the angular case.

2. The sealed cell according to claim 1, wherein
an additional concave portion other than the at least two concave portions is formed on the side wall, and
a gas discharge valve for discharging gas generated in the angular case is disposed on a bottom surface of the additional concave portion, and
the additional concave portion has three inner walls rising from the bottom surface so as to surround three sides of the gas discharge valve disposed on the bottom surface, and an opening in which an inner wall is not formed and which opens to the outside of the angular case.

3. The sealed cell according to claim 1, wherein
an additional concave portion other than the at least two concave portions is formed on the side wall,
a liquid injection plug for closing a liquid injection hole for the electrolytic solution is disposed in a bottom surface of the additional concave portion, and
the additional concave portion has three inner walls rising from the bottom surface so as to surround three sides of the plug disposed on the bottom surface, and an opening in which an inner wall is not formed and which opens to the outside of the angular case.

4. A cell pack in which a plurality of chargeable/dischargeable cells are connected in series, the cell pack comprising:
a plurality of sealed unit cells each including: an electrode body that includes a positive electrode and a negative electrode;
an angular case that accommodates the electrode body and an electrolytic solution; and
electrode terminals that are electrically connected to the electrode body and drawn to an outside of the angular case, wherein
in each of the plurality of unit cells, the angular case comprises a concave case main body having an opening and a sealing member attached so as to cover the opening of the concave case main body; and
the plurality of unit cells are arranged in a direction in which the concave case main body and the sealing member are overlapped in the angular case provided in each of the plurality of unit cells, and are restrained in a state in which a load is applied in the direction, wherein
in each of the plurality of unit cells, the concave case main body has a flat surface, which is mutually opposing a surface of the angular case of the adjacent unit cell case and which receive the load applied in the direction, and a side wall rising from the flat surface so as to surround the electrode body;
in each of the plurality of unit cells, a peripheral edge portion of the opening provided in the concave case main body and the sealing member are joined to each other by seal welding;
a convex portion, which is pressed against the angular case of the adjacent unit cell, and at least two concave portions, which are not in contact with the angular case of the adjacent unit cell, are formed on a portion of the side wall;
each of the electrode terminals is respectively disposed on a bottom surface of each of the at least two concave portions; and
each of the at least two concave portions has three inner walls rising from the bottom surface so as to surround three sides of the electrode terminal disposed on the bottom surface, and an opening in which an inner wall is not formed and which opens to the outside of the angular case.

5. The cell pack according to claim 4, wherein
in each of the plurality of unit cells, an additional concave portion other than the at least two concave portions is formed on the portion of the side wall,
a gas discharge valve for discharging gas generated in the case is disposed on a bottom surface of the additional concave portion, and
the additional concave portion has three inner walls rising from the bottom surface so as to surround three sides of the gas discharge valve disposed on the bottom surface, and an opening in which an inner wall is not formed and which opens to the outside of the angular case.

6. The cell pack according to claim 4, wherein
in each of the plurality of unit cells, an additional concave portion other than the at least two concave portions is formed on the portion of the side wall,
a liquid injection plug for closing a liquid injection hole for the electrolytic solution is disposed in a bottom surface of the additional concave portion, and
the additional concave portion has three inner walls rising from the bottom surface so as to surround three sides of the liquid injection plug disposed on the bottom surface, and an opening in which an inner wall is not formed and which opens to the outside of the angular case.

* * * * *